United States Patent [19]

Zwack et al.

[11] Patent Number: 5,389,219

[45] Date of Patent: * Feb. 14, 1995

[54] PHOTODEGRADATION-RESISTANT ELECTRODEPOSITABLE PRIMER COMPOSITIONS

[75] Inventors: Robert R. Zwack; V. Eswarakrishnan, both of Allison Park, Pa.

[73] Assignee: PPG Industries, Inc., Pittsburgh, Pa.

[ * ] Notice: The portion of the term of this patent subsequent to Nov. 9, 2010 has been disclaimed.

[21] Appl. No.: 79,788

[22] Filed: Jun. 23, 1993

Related U.S. Application Data

[63] Continuation-in-part of Ser. No. 745,797, Aug. 16, 1991, Pat. No. 5,260,135, which is a continuation-in-part of Ser. No. 736,199, Jul. 26, 1991, abandoned.

[51] Int. Cl.$^6$ .............................................. C25D 13/10
[52] U.S. Cl. ............................... 204/181.1; 204/181.4; 427/407.1; 427/409
[58] Field of Search ..................... 204/181.1, 181.4; 427/409, 407.1

[56] References Cited

U.S. PATENT DOCUMENTS

| | | | |
|---|---|---|---|
| 3,799,854 | 3/1974 | Jerabek | 204/181 |
| 4,031,050 | 6/1977 | Jerabek | 260/29.2 TN |
| 4,294,741 | 10/1981 | Bosso | 260/29.6 NR |
| 4,297,261 | 10/1981 | Jozwiak, Jr. | 260/29.7 RP |
| 4,477,519 | 10/1984 | Frye | 428/331 |
| 4,524,192 | 6/1985 | Alexander et al. | 525/440 |
| 4,576,980 | 3/1986 | Dai et al. | 523/420 |
| 4,612,098 | 9/1986 | Dai et al. | 204/181.7 |
| 4,756,975 | 7/1988 | Fujii et al. | 428/461 |
| 4,812,337 | 3/1989 | Sugimura et al. | 427/407.1 |
| 4,981,759 | 1/1991 | Nakatani et al. | 428/626 |
| 5,106,651 | 4/1992 | Tyger et al. | 427/54.1 |
| 5,112,890 | 5/1992 | Behrens et al. | 524/95 |
| 5,205,916 | 4/1993 | Chung et al. | 204/181.7 |
| 5,260,135 | 11/1993 | Corrigan et al. | 204/181.1 |

FOREIGN PATENT DOCUMENTS 62-236873 10/1987 Japan .

*Primary Examiner*—John Niebling
*Assistant Examiner*—Kishor Mayekar
*Attorney, Agent, or Firm*—William J. Uhl

[57] ABSTRACT

Electrodepositable primer compositions comprising an aqueous dispersion of an ionic epoxy-based resin, a hindered amine light stabilizer and an antioxidant mixture which comprises a phenolic antioxidant and a sulfur-containing antioxidant. The primer compositions find particular use under topcoats which are permeable to UV radiation which, in the absence of the hindered amine and antioxidant mixture, causes delamination of the topcoat from the primer coat.

8 Claims, No Drawings

PHOTODEGRADATION-RESISTANT ELECTRODEPOSITABLE PRIMER COMPOSITIONS

CROSS-REFERENCE TO RELATED APPLICATIONS

This application is a continuation-in-part of application Ser. No. 07/745,797, filed Aug. 16, 1991, now U.S. Pat. No. 5,260,135, which is a continuation-in-part of application Serial No. 07/736,199, filed Jul. 26, 1991, now abandoned.

FIELD OF THE INVENTION

This invention relates to an electrodepositable primer composition. More particularly, this composition is well suited for reducing or eliminating delamination between topcoats and primer coats as a result of photodegradation of primer compositions.

BACKGROUND OF THE INVENTION

Electrodepositable primer coating compositions, particularly in the automotive industry, are typically corrosion resistant epoxy-based compositions and are typically crosslinked with aromatic isocyanates. If exposed to sunlight, such compositions undergo photodegradation from ultraviolet light. In some automotive applications, a spray applied primer surfacer is applied to the electrocoat before topcoating to provide protection from photodegradation. In other automotive applications, topcoats are applied directly to the electrocoat and in these instances, the topcoat usually prevents UV radiation from reaching the primer surface. However, if a topcoat does not provide sufficient protection, extensive photodegradation of the electrocoat can result in a loose powdery surface being formed on the primer. In such a case, delamination between the primer coat and the topcoat results from the formation of the loose powdery layer.

Typically, if a topcoat is sufficiently opaque to UV light by being filled with pigment and/or light-absorbing compounds, no ultraviolet light penetrates to the surface of epoxy-based primers to cause photodegradation. However, in the case of a thin topcoat and/or a topcoat which is not UV light absorbing, ultraviolet light can pass through the topcoat and cause photodegradation of an epoxy-based primer. The photodegradation results in delamination of the topcoat from the primer coat which produces catastrophic failure of the coating system. This problem is particularly likely to occur when a topcoat is lightly pigmented with metal flake pigments which tend to allow radiation to pass through to the primer.

Typically, the best way to avoid photodegradation of printer coatings is by formulating topcoats to prevent transmission of ultraviolet light to the primer surface. For example, the use of thick topcoats or opaque topcoats is usually sufficient. Also, the use of components in the topcoat to prevent transmission of ultraviolet light, such as ultraviolet light absorbers, can be successful in avoiding photodegradation of the primer. However, reliance on proper formulation of topcoats can be unsatisfactory in the painting operation because of variations in the quality of topcoats. Accordingly, there is a need for a primer composition which retards photodegradation and subsequent delamination independent of the quality of the topcoat.

Other factors can aggravate the photosensitivity of an epoxy-based primer and can contribute to delamination of a topcoat from a primer coat, such as use of aromatic isocyanate crosslinkers or of $TiO_2$ as a pigment in electrodeposition coatings. Additionally, overbake of the electrodepositable coating at excessive times or temperatures or baking in an oxidizing atmosphere can aggravate the problem.

In copending application Ser. No. 07/745,797 mentioned above, photodegradation-resistant electrodepositable compositions are disclosed. The compositions contain an epoxy-based ionic resin, a hindered amine light stabilizer and optionally a phenolic antioxidant. Although the compositions provide excellent resistance to photodegradation of the electrodeposited primer and excellent resistance to subsequent topcoat delamination, the compositions contain relatively high amounts of hindered amine, typically on the order of about one percent by weight based on resin solids, and low amounts of phenolic antioxidants, i.e., about 0.1 percent by weight. Unfortunately, the hindered amine is a relatively expensive material, particularly in comparison to the phenolic compound, and incorporating the hindered amine into the composition at levels of about one percent can be prohibitively expensive. It would be desirable to find a way to reduce the amount of hindered amine while maintaining optimum resistance to photodegradation of the electrodeposited primer layer and consequent delamination of the subsequently applied topcoat.

U.S. Pat. No. 5,205,916 discloses electrodepositable primer compositions containing an aqueous dispersion of an epoxy-based ionic resin and an antioxidant additive which is a combination of a phenolic antioxidant and a sulfur-containing antioxidant. The additive is disclosed as reducing overbake yellowing of the composition and also reducing intercoat delamination of subsequently applied topcoats upon exterior exposure. However, it has been found that such compositions are not as effective in preventing electrodeposited primer-topcoat delamination as are compositions containing hindered amine light stabilizers.

Summary of the Invention

In accordance with the present composition, an electrodepositable primer composition comprising an aqueous dispersion of an ionic epoxy-based resin, a hindered amine light stabilizer and an antioxidant which is the combination of a phenolic antioxidant and a sulfur-containing antioxidant is provided. The hindered amine light stabilizer is present in the composition in amounts of from about 0.1 to 3 percent by weight, and the antioxidant mixture is present in the composition in amounts of 0.1 to 5 percent by weight; the percentage by weight being based on weight of resin solids. The ratio of the antioxidant mixture to hindered amine is at least 0.5:1.

The electrodepositable primer compositions of the present invention can be formulated with relatively low levels of hindered amine light stabilizer. Comparable compositions which do not contain the antioxidant mixture require considerably higher amounts of hindered amine to achieve equivalent resistance to delamination.

Detailed Description of the Invention

The present primer composition addresses the problem of delamination of topcoats caused by photodegradation of epoxy-based primers by including in the primer composition a hindered amine light stabilizer (HALS) and an antioxidant mixture comprising a phenolic antioxidant and a sulfur-containing antioxidant. In this manner, topcoat quality variations in the ability to screen ultraviolet light are at least partially compensated for by the present invention. Therefore, the present primer composition is particularly well suited for use with a wide variety of topcoats.

compound is required to make it an active radical trap as is necessary for non-aminoether type HALS. A representative commercially available hindered aminoether light stabilizer is identified as TINUVIN-123 and is sold by Ciba-Geigy Corporation. The aminoether of TINUVIN-123 is bis-(1-octyloxy-2,2,6,6-tetramethyl-4-pi-peridinyl) sebacate and has the formula (III):

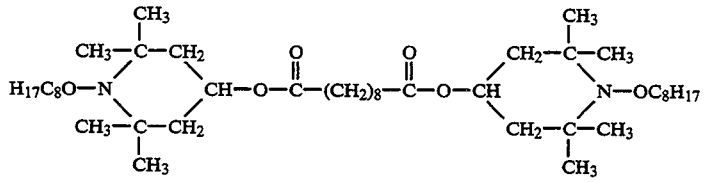

A primary component of the electrodeposition primer composition of the present invention is a hindered amine light stabilizer, a preferred embodiment of which is a hindered aminoether light stabilizer. The hindered amine light stabilizer is included in the present composition in amounts between about 0.1% and about 3%, more preferably between about 0.3% and about 1.0% and most preferably between about 0.3% and 0.7% based on total weight of resin solids. As is known, the ultraviolet region of sunlight (300 nanometers–400 nanometers) initiates free radicals in organic coatings which can cause degradation of the coating by several known or suggested mechanisms.

The hindered amine light stabilizers of the present invention are a recognized class of compounds which act as free radical scavengers to reduce photodegradation of a composition by ultraviolet light, such as the class of compounds which are N-substituted 2,2,6,6-tetraalkylpiperidines. HALS include compounds having a group of the formula (I):

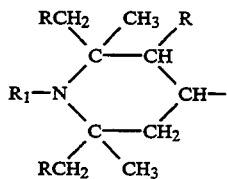

wherein R represents a hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_{18}$ alkanoyl or $C_3$–$C_5$ alkenoyl. Representative commercially available HALS are identified as TINUVIN 770, TINUVIN 292 and TINUVIN 440 and are sold by Ciba-Geigy Corporation.

A preferred class of HALS are hindered aminoether light stabilizers. Such compounds have a group of the formula (II):

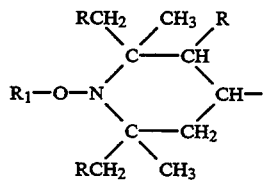

wherein $R_1$ and R are as discussed above. Hindered aminoether light stabilizers are believed to be particularly effective as HALS because no oxidation of the Without intending to be bound by theory, it is believed that hindered amine light stabilizers are particularly effective when the hindered amine light stabilizers are relatively non-volatile. In this manner, upon heating of the applied composition for cure and particularly in the event of overbake, a greater percentage of the HALS is likely to remain in the cured composition as compared to a more volatile HALS. For this reason, another preferred aspect of the invention is the use of a non-volatile HALS. As used herein, the term non-volatile generally refers to a HALS which has less than about a 5% weight loss after 30 minutes at 175° C., more preferably less than about a 4% weight loss and most preferably less than about a 3% weight loss.

In a further preferred embodiment of the invention, the HALS component has a pKb>7. In this manner, the HALS is particularly compatible with a subsequently applied topcoat when the topcoat includes an acid-catalyzed aminoplast crosslinker. Since such a HALS is a weak base, it will not inhibit the acid-catalyzed cure.

The antioxidant additive is a mixture of a phenolic antioxidant and a sulfur-containing antioxidant. It has been found that these antioxidants in combination with one another and with the hindered amine light stabilizer provide excellent resistance to photodegradation of the electrodeposited primer layer and delamination of the subsequently applied topcoat, and further provide these results at significantly reduced levels of hindered amine light stabilizer over comparable compositions in which the antioxidant additive is not present. Examples of phenolic antioxidants are sterically hindered phenols and include the triazine of a hindered phenol which is commercially available as CYANOX 1790 from American Cyanamid and is the preferred phenolic antioxidant. Other useful phenolic antioxidants include 2,2'-methylene-bis(4-methyl-6-t-butylphenol), 1,3,5-trimethyl-2,4,6-tris(3,5-di-t-butyl-4-hydroxybenzyl) benzene and tetrakis[methylene-3-(3,5-di-t-butyl-4-hydroxyphenyl) propionate]methane.

Typical sulfur-containing antioxidants include alkyl thioesters such as dilauryl thiodipropionate which is commercially available as CYANOX LTDP from American Cyanamid and distearyl thiodipropionate which is commercially available as CYANOX STDP from American Cyanamid. Other useful sulfur-containing antioxidants include dioctyl thiopropionate and sulfur-containing acrylic polymers.

The antioxidant additive is used in amounts of 0.1 to 5% by weight based on weight of resin solids in the electrodepositable primer composition. Preferably, the phenolic antioxidant is present in amounts of 0.1 to 2% by weight and the sulfur-containing antioxidant is present in amounts of 0.1 to 2% by weight.

The ratio of the antioxidant mixture to hindered amine should be at least 0.5:1, preferably 0.5 to 3:1, to provide significant improvements in delamination resistance particularly at reduced levels of hindered amine, i.e., at amounts of 0.3 to 0.7 percent.

Typically, the weight ratio of sulfur-containing antioxidant to phenolic-containing antioxidant is from 0.2–5:1.

The ionic resin of the present composition can be any standard cationic or anionic resin commonly available to the art. Preferably, the present ionic resin is cationic. The cationic resins are typically epoxy-based resins, i.e., resins that are derived from epoxy resins, for example, acid-solubilized epoxy-amine additives which are combined with a crosslinking agent.

The epoxy resins are preferably polyepoxides and are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl) methane or the like.

Besides polyhydric phenols, other cyclic polyols can be used in preparing the polyglycidyl ethers of cyclic polyol derivatives. Examples of other cyclic polyols would alicyclic polyols, particularly cycloaliphatic polyols, such as 1,2-cyclohexanediol, 1,4-cyclohexanediol, 1,2-bis-(hydroxymethyl)cyclohexane, 1,3-bis-(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307, column 2, line 67, to column 4, line 52, the portions of which are hereby incorporated by reference. Examples of polyester polyols for chain extension are disclosed in U.S. Pat. No. 4,148,772, column 4, line 42, to column 5, line 53, the portions of which are hereby incorporated by reference.

The polyepoxide is reacted with a cationic group former, for example, an amine and acid. The amine can be a primary, secondary or tertiary amine and mixtures of thereof.

The preferred amines are monoamines, particularly hydroxyl-containing amines. Although monoamines are preferred, polyamines such as ethylene diamine, diethylamine triamine, triethylene tetramine, N-(2-aminoethyl)ethanolamine and piperazine can be used but their use in large amounts is not preferred because they are multifunctional and have a greater tendency to gel the reaction mixture than monoamines.

Tertiary and secondary amines are preferred to primary amines because the primary amines are polyfunctional with regard to reaction with epoxy groups and have a greater tendency to gel the reaction mixture. When using polyamines or primary amines, special precautions should be taken to avoid gelation. For example, excess amine can be used and the excess can be vacuum stripped at the completion of the reaction. Also, the polyepoxide resin can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl substituents. Specific examples include ethanolamine, N-methylethanolamine, diethanolamine, N-phenyle thanolamine, N,N-dimethylethanolamine, N-methyldiethanolamine and triethanolamine.

Amines which do not contain hydroxyl groups such as mono, di and tri-alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine, N-benzyldimethylamine, dimethylcocamine and dimethyltallowamine. Also, amines such as hydrazine and propylene imine can be used. Ammonia can also be used and is considered for the purposes of this application to be an amine.

Mixtures of the various amines described above can be used. The reaction of the primary and/or secondary amine with the polyepoxide resin takes place upon mixing the amine with the product. The reaction can be conducted neat, or, optionally in the presence of a suitable solvent. Reaction may be exothermic and cooling may be desired. However, heating to a moderate temperature, that is, within the range of 50° to 150° C., may be used to hasten the reaction.

The reaction product of the primary or secondary amine with the polyepoxide resin attains its cationic character by at least partial neutralization with acid. A group of preferred acids which are used in preparing the electrocoating composition of the invention are sulfamic acid and derivatives thereof, this is, those acids of the structure:

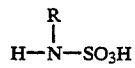

where R is H or $C_1$ to $C_4$ alkyl. Preferably, the acid is sulfamic acid itself. Hereafter, when "sulfamic acid" is used, not only sulfamic acid itself but also its derivatives as depicted by the above structure are intended. The use of sulfamic acid for neutralization is discussed in detail in U.S. Pat. No. 4,933,056 which is incorporated herein by reference. Examples of other suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

In the reaction of the tertiary amine with the polyepoxide resin, the tertiary amine can be prereacted with the acid such as those mentioned above to form the amine salt and the salt reacted with the polyepoxide to form the quaternary ammonium salt group-containing resin. The reaction is conducted by mixing the amine salt and the polyepoxide resin together in the presence of water. Typically, the water is employed on the basis of about 1.75 to about 20 percent by weight based on total reaction mixture solids.

Alternately, the tertiary amine can be reacted with the polyepoxide resin in the presence of water to form a quaternary ammonium hydroxide group-containing polymer which, if desired, may be subsequently acidified. The quaternary ammonium hydroxide-containing polymers can also be used without acid, although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although a solvent such as a sterically hindered ester, ether or sterically hindered ketone may be used if desired.

In addition to the primary, secondary and tertiary amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents which are described in more detail below.

Besides resins containing amine salts and quaternary ammonium base groups, resins containing other cationic groups can be used in the practice of this invention. Examples of other cationic resins are quaternary phosphonium resins and ternary sulfonium resins. However, resins containing amine salt groups and quaternary ammonium base groups are preferred and the amine salt group-containing resins are the most preferred.

The extent of cationic group formation of the resin should be selected so that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

In general, most of the cationic resins prepared by the process of the invention contain from about 0.1 to 3.0, preferably from about 0.3 to 1.0 milliequivalents of cationic group per gram of resin solids.

The cationic resinous binders should preferably have weight average molecular weights, as determined by gel permeation chromatography using a polystyrene standard, of less than 100,000, more preferably less than 75,000 and most preferably less than 50,000 in order to achieve high flowability.

The preferred crosslinkers in the present composition are blocked isocyanates, that is, organic polyisocyanates in which the isocyanato groups have been reacted with a compound so that the resultant blocked or capped isocyanate is stable to active hydrogens at room temperature but reactive with active hydrogens at elevated temperatures, usually between 90° and 200° C. Aromatic and aliphatic, including cycloaliphatic, polyisocyanates may be used and representative examples include diphenylmethane-4,4'-diisocyanate (MDI), 2,4- or 2,6-toluene diisocyanate including mixtures thereof (TDI), p-phenylene diisocyanate, tetramethylene and hexamethylene diisocyanates, dicyclohexylmethane-4,4'-diisocyanate, isophorone diisocyanate, mixtures of diphenylmethane-4,4'-diisocyanate and polymethylene polyphenylisocyanate. Higher polyisocyanates such as triisocyanates can be used. An example would include triphenylmethane-4,4',4"-triisocyanate. NCO-prepolymers such as reaction products of polyisocyanates with polyols such as neopentyl glycol and trimethylolpropane and with polymeric polyols such as polycaprolactone diols and triols (NCO/OH equivalent ratio greater than 1) can also be used. Preferred polyisocyanates are mixtures of diphenylmethane-4,4'-diisocyanate and polymethylene polyphenylisocyanates. Such mixtures are commonly referred to as crude MDI or polymeric MDI. A particularly preferred mixture is available from Mobay Chemical Co. as MONDUR MRS 2.

Some isocyanate crosslinkers are preferred from the standpoint of preventing delamination because, in the event of accidental extreme cure times and temperatures, i.e., overbake, they volatilize before thermally breaking down and causing delamination. Illustrative of such volatile polyisocyanates is TDI. In the case of non-volatile polyisocyanates, such as polymeric MDI, the potential for delamination can be reduced by limiting the amount of the polyisocyanate in the formulation as much as possible.

The blocked polyisocyanate can be used in two similar ways. The polyisocyanate can be fully blocked, that is, no free isocyanate groups remain and then added to the cationic polymer to form a two-component resin. Or, the polyisocyanate can be partially blocked, for example, half-blocked diisocyanate, so that there is one remaining reactive isocyanate group. The half-blocked isocyanate can then be reacted with active hydrogen groups in the polymer backbone under conditions which will not unblock the blocked isocyanate group. This reaction makes the isocyanate part of the polymer molecule and a one-component resin.

Whether fully blocked or partially blocked, sufficient polyisocyanate is present with the cationic polymer so that there are about 0.1 to about 1.2 isocyanate groups for each active hydrogen, i.e., hydroxyl, primary and secondary amino and thiol.

Preferably, the molecular weight of the crosslinker, measured as viscosity average molecular weight, is less than 40,000 in order to achieve high flowability.

The cationic resin and the blocked isocyanate are the principal resinous ingredients in the electrocoating compositions. They are usually present in amounts of about 50 to 100 percent by weight of resin solids.

Preferably, the electrodepositable coating compositions of the present invention are of the high film build type, that is, they are capable of being electrodeposited and cured as a substantially continuous thick film. By thick is meant a film having a dry film thickness of at least 25 and usually from about 25 to 75 microns. Preferably, the film will have a thickness of at least 30 and more preferably of at least 35 microns.

Optionally, the compositions of the invention can include an ultraviolet light absorber. Typically, such compound is present in the composition in amounts of between about 0.05 weight percent and about 5 weight percent, and more preferably between about 0.1 weight percent and about 3 weight percent, and most preferably between about 0.1 weight percent and about 1.0 weight percent based on total weight of resin solids.

Ultraviolet light absorbers function by absorbing ultraviolet radiation and disposing of the energy without interacting with the polymers in the coating composition in any harmful way. Recognized classes of ultraviolet radiation absorbers include derivatives of 2-hydroxybenzophenone, 2-(2-H-benzotriazol-2-yl) phenols, phenyl esters and substituted cinnamic acid derivatives.

The electrodepositable composition of the present invention also usually contains a pigment which is incorporated into the composition in the form of a paste. The pigment paste is prepared by grinding or dispersing a pigment into a grinding vehicle and optional ingredients such as wetting agents, surfactants and defoamers. Grinding is usually accomplished by the use of ball mills, Cowles dissolvers, continuous attritors and the like until the pigment has been reduced to the desired size and has been wetted by and dispersed by the grinding vehicle. After grinding, the particle size of the pigment should be as small as practical, generally, a Hegman grinding gauge rating of about 6 to 8 is usually employed. Suitable pigment grinding vehicles can be selected from those known in the art.

Pigments which can be employed in the practice of the invention include titanium dioxide, basic lead silicate, carbon black, strontium chromate, iron oxide, clay and phthalocyanine blue. Pigments with high surface areas and oil absorbencies should be used judiciously because they can have an undesirable effect on coalescence and flow.

In addition to the above-described components, the present composition can also include various additives such as surfactants, wetting agents, catalysts, film build additives, and additives to enhance flow and appearance of the composition. Such additives are typically in the composition in amounts of about 0.01 to about 70 percent by weight based on total weight of resin solids.

The present invention is also directed to a process for coating a substrate which includes applying the electrodepositable film-forming primers, as broadly described above, to a substrate and subsequently applying a film-forming resin which transmits ultraviolet radiation, i.e. radiation having a wavelength of about 400 nanometers or less, to the primer composition. Such a process is particularly useful because the primer reduces the effect of photodegradation caused by transmission of ultraviolet light through the topcoat.

In the electrodeposition process for applying the electrodepositable film-forming primer of the present invention, the primer is placed in contact with an electrically conductive anode and an electrically conductive cathode. If the ionic resin in the primer composition contains cationic groups, the surface to be coated is the cathode. If the ionic resin contains anionic groups, the surface to be coated is the anode. Upon passage of electric current between the anode and the cathode, while in contact with the bath containing the primer composition, an adherent film of the composition is deposited on the surface to be coated. In the present invention, the resin is preferably a cationic resin.

The conditions under which the electrodeposition is carried out are, in general, those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition. The method of the invention is applicable to the coating of any electrically conductive substrate, and especially metals such as steel, aluminum, copper and the like.

After deposition, the primer coating is cured at elevated temperatures by any convenient method such as in baking ovens or with banks of infrared heat lamps. Typically, cure is obtained at temperatures of about 200° F. to about 400° F.

After electrodeposition of the primer coating and either before or after cure of the primer, a subsequent topcoat is applied to the primed substrate. The topcoat is typically a pigmented composition and can be a single pigmented layer or a "color-plus-clear" two component system. The topcoat is then cured. Although a preferred embodiment of the present process includes the application of a topcoat over the primer, it should be noted that a composition in accordance with the present primer composition can be used as a single coat system and is believed to have improved durability.

As discussed above, the foregoing process is particularly useful when the topcoat does not adequately screen ultraviolet light which passes through the topcoat to impinge on the primer. Due to the hindered amine light stabilizer and the antioxidant mixture in the primer, photodegradation of the primer is significantly reduced or prevented.

The following examples are provided for the purpose of illustration of the present invention and are not intended to limit the scope of the invention, as claimed below.

EXAMPLES

Examples A–D show the preparation of aqueous dispersions of ionic epoxy-based resins and isocyanate crosslinkers. Examples B–D contained various antioxidants or hindered amine light stabilizers as shown in the Examples. Example A was for the purpose of control and contained no antioxidant or hindered amine light stabilizer. Example E shows the preparation of a flow control additive.

Examples 1–8 show the preparation of various electrodepositable compositions comprising the aqueous dispersions of Examples A–D, the flow control additive of Example E and various pigments and additives commonly found in electrodepositable compositions.

The electrodepositable compositions were used to electrocoat metal panels and the electrodeposited coating cured at various temperatures. The coated panels were then topcoated with a coating which was permeable to ultraviolet (UV) light. The topcoated panels were exposed sequentially to UV light and high humidity conditions and then evaluated for adhesion of the topcoat to the electrodeposited coating.

Example A

An aqueous dispersion of an ionic epoxy-based resin and an isocyanate crosslinker was prepared from the following ingredients:

| Ingredients | Parts by Weight |
| --- | --- |
| EPON 828 | 1128 |
| Bisphenol A-ethylene oxide adduct (1/6 molar ratio) | 401.56 |
| Bisphenol A | 327 |
| Methyl isobutyl ketone | 97.72 |
| Benzyldimethylamine | 1.64 |
| Benzyldimethylamine | 4.52 |
| Crosslinker[1] | 1609.34 |
| Diketimine[2] | 123.74 |
| N-methylethanolamine | 108.6 |
| DOWANOL PPH | 65.24 |

[1] The capped polyisocyanate crosslinker was prepared from the following mixture of ingredients:

| Ingredients | Parts by Weight |
| --- | --- |
| Toluene diisocyanate | 1301.7 |
| Methyl isobutyl ketone | 990.8 |
| 2-(2-butoxyethoxy)ethanol | 1213.6 |
| Dibutyltin dilaurate | 0.72 |
| Trimethylolpropane | 334.2 |

Toluene diisocyanate and methyl isobutyl ketone were charged to a reaction flask and heated under a nitrogen atmosphere to 30° C. 2-(2-butoxyethoxy)ethanol was added slowly allowing the reaction to exotherm to a temperature between 60 to 65° C. Upon completion of the addition, the reaction mixture was held at 65° C. for 90 minutes. The dibutyltin dilaurate and trimethylolpropane were then added and the mixture heated to 80° C. and held there until infrared analysis indicated no unreacted NCO remained.

[2] Diketimine derived from diethylenetriamine and methyl isobutyl ketone (73% solids in methyl isobutyl ketone).

The EPON 828 (diglycidyl ether of bisphenol A available from Shell Chemical Co.), bisphenol A-ethylene oxide adduct, bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for ½ hour, cooled further to 145° C. and the second portion of benzyldimethylamine added. The reaction was held at 145° C. until a reduced Gardner-Holdt viscosity (50 percent resin solids in 2-methoxypropanol) of R-S was obtained. At this point, the crosslinker, the diketimine and N-methylethanolamine were added in succession. The mixture was allowed to exotherm and then a temperature of 125° C. was established. After one hour at 125° C., DOWANOL PPH (2-phenoxypropanol available from Dow Chemical Co.) was added to the mixture and the mixture allowed to mix for 15 minutes at 125° C. The resin mixture (3200 parts) was dispersed in aqueous medium by adding it to a mixture of 85.16 parts of sulfamic acid and 1728 parts of deionized water. The dispersion was further thinned with 1114 parts of deionized water and 1750 parts of deionized water in stages and vacuum stripped to remove organic solvent to give a dispersion having a solids content of 37.2 percent and a particle size of 650 Angstroms.

Example B

An aqueous dispersion similar to Example A was prepared but replacing the 65.24 parts by weight (pbw) DOWANOL PPH with 65.24 pbw of a hindered amine light stabilizer TINUVIN 123 available from Ciba-Geigy Corporation. The dispersion had a solids content of 37.1 percent and a particle size of 940 Angstroms.

Example C

An aqueous dispersion similar to Example A was prepared but replacing the 65.24 pbw DOWANOL PPH with 65.24 pbw of a phenolic antioxidant CYANOX 1790. The dispersion had a solids content of 35.2 percent and a particle size of 792 Angstroms.

Example D

An aqueous dispersion similar to Example A was prepared but replacing the 65.24 pbw DOWANOL PPH with 65.24 pbw of a sulfur-containing antioxidant CYANOX LTDP. The dispersion had a solids content of 36.2 percent and a particle size of 967 Angstroms.

Example E

A resinous flow control additive which is a polyepoxide-polyoxyalkylenediamine adduct was prepared as follows: An intermediate polyepoxide was prepared from the following ingredients:

| Ingredients | Parts by Weight |
| --- | --- |
| EPON 828 | 1000.0 |
| Bisphenol A | 308.1 |
| Ethyltriphenyl phosphonium iodide | 1.3 |
| 2-Butoxyethanol | 413.5 |

The EPON 828 and bisphenol A were charged to a reaction vessel under a nitrogen blanket and heated to 110° C. The reaction mixture was held at 110° C. until all the bisphenol A had dissolved whereupon the ethyltriphenyl phosphonium iodide catalyst was added and the reaction mixture was heated to 160° to initiate reaction. The mixture was allowed to exotherm to 180° C. and then cooled to 160° C. where it was held for an hour to complete reaction. When the hold was over, the 2-butoxyethanol was added to give a solids content of percent and an epoxy equivalent of 504 (based on solids). The adduct was then prepared from the following mixture of ingredients:

| Ingredients | Parts by Weight |
| --- | --- |
| JEFFAMINE D-2000 | 2362.2 |
| Polyepoxide intermediate prepared as described above | 1141.6 |
| 2-Butoxyethanol | 296.1 |
| 88% Aqueous tactic acid solution | 96.6 |
| Deionized water | 5279.1 |

A polyoxypropylenediamine having a molecular weight of 2000 and commercially available from Texaco Chemical Company as JEFFAMINE D-2000 was reacted with the polyepoxide intermediate as follows: The JEFFAMINE D-2000 was charged to a reaction vessel under a nitrogen atmosphere and heated to 90° C. The polyepoxide intermediate and the butoxyethanol were added over a one-half hour period. At the completion of the addition, the reaction mixture was heated to 130° C. and held there for three hours. The resin was then dispersed by pouring into a mixture of the 88% aqueous lactic acid solution and detonized water. The resulting reaction product had a solids content of 36.0 percent.

Examples 1–8

A series of eight (8) electrodepositable compositions were prepared from the aqueous dispersions of Examples A-D, the flow control resin of Example E and various optional ingredients as shown in Table I below.

TABLE I

TABLE II

Adhesion Results

| | Percent by Weight Additive[1] | | | Rating 400° F. Bake | | Rating 425° F. Bake | |
|---|---|---|---|---|---|---|---|
| Example No. | TINUVIN 123[2] | CYANOX 1790[3] | CYANOX LTDP[4] | Exposed 8 weeks | Exposed 12 weeks | Exposed 7 weeks | Exposed 9 weeks |
| 1 (Control) | 0 | 0 | 0 | 1 | 0 | 3 | 1 |
| 2 (Comparative) | 1 | 0 | 0 | 8 | 1 | 8 | 6 |
| 3 (Comparative) | 0 | .5 | .5 | 6 | 0 | 2 | 1 |
| 4 | .67 | .17 | .17 | 10 | 5 | 8 | 8 |
| 5 | .6 | .1 | .3 | 9 | 3 | 6 | 4 |
| 6 | .33 | .33 | .33 | 8 | 5 | 9 | 7 |
| 7 | .17 | .67 | .17 | 5 | 1 | 8 | 4 |
| 8 | .17 | .17 | .67 | 6 | 2 | 1 | 0 |

[1]Percent by weight based on resin solids.
[2]Bis-(1-octyloxy-2,2,6,6-tetramethyl-4-piperidinyl sebacate.
[3]1,3,5-Tris(4-tert-butyl-3-hydroxy-2,6-dimethylbenzyl)-1,3,5-triazine-2,4,6-(1H, 3H, 5H)-trione.
[4]Dilaurylthiodipropionate.

| | Electrodeposition Compositions | | | | | | | |
|---|---|---|---|---|---|---|---|---|
| | Example Numbers (Parts by Weight | | | | | | | |
| Ingredient | 1 | 2 | 3 | 4 | 5 | 6 | 7 | 8 |
| Example E | 197 | 197 | 197 | 197 | 197 | 197 | 197 | 197 |
| Deionized water | 82 | 82 | 82 | 82 | 82 | 82 | 82 | 82 |
| PARAPLEX WP1[1] | 43 | 43 | 43 | 43 | 43 | 43 | 43 | 43 |
| Example A | 1621 | 656 | 656 | 656 | 656 | 656 | 656 | 656 |
| Example B | — | 960 | — | 640 | 574 | 319 | 160 | 160 |
| Example C | — | — | 506 | 169 | 101 | 337 | 675 | 169 |
| Example D | — | — | 492 | 164 | 297 | 327 | 164 | 656 |
| Deionized water | 1853 | 1858 | 1820 | 1845 | 1846 | 1835 | 1819 | 1833 |
| Pigment paste[2] | 204 | 204 | 204 | 204 | 204 | 204 | 204 | 204 |
| TOTAL | 4000 | 4000 | 4000 | 4000 | 4000 | 4000 | 4000 | 4000 |

[1]Plasticizer available from Rohm and Haas Company.
[2]Pigment paste available from PPG Industries, Inc. as E-6064, containing 27.2% titanium dioxide, 1.4% carbon black, 15.9% aluminum silicate, 5.7% basic lead silicate and 3.8% dibutyltin oxide.

The first three ingredients were mixed together for thirty (30) minutes. The other ingredients were added with agitation in the order listed.

The electrodepositable compositions had a solids content of 21 percent and were adjusted to a pH of 6.0 to 6.5 with 25 percent by weight acetic acid. The compositions were filtered through 3M OIL SORBENT pads. Smooth phosphated steel panels were electrodeposited in the composition to a thickness of 1.2 mils and the electrodeposited coating cured for 30 minutes at 400° F. (204° C.) and for 30 minutes at 425° F. (218° C.) in a gas-fired oven.

A metallic light blue basecoat available from PPG Industries, Inc. as HBAL-9264 was diluted with its own resinous vehicle to an extent that when applied at 0.35 mil, followed by application of a 1.0 mil acrylic clear coat available from PPG Industries, Inc. as E-5697, and the combination baked 30 minutes at 250° F. (121° C.), the combination allowed 50 percent transmission of 400 nanometer wavelength UV radiation.

The electrocoated test panels were spray applied with the 50 percent transmission basecoat-clear coat combination and baked for 30 minutes at 250° F. (121° C.) and exposed at Fort Lauderdale, Florida, at ° south for varying times as reported in Table II below. They were then exposed to 100° F. (38° C.), 100% relative humidity in a humidity chamber for 24 hours. The coated panels were then evaluated for crosshatch adhesion of the topcoat from the electrodeposited coating. In the evaluation, 10 is best with no loss of adhesion and 0 is worst with complete delamination of the topcoat from the electrodeposited coating.

All antioxidant additives (Example 3) provide only a slight improvement over the control (Example 1). While the use of all hindered amine light stabilizer (Example 2) imparts a major improvement, it requires a relatively high amount of the expensive hindered amine. Best results were obtained by combining antioxidants and hindered amine light stabilizers as in Examples 4 and 6. Combination 5 and 7 provide protection close to that of all hindered amine at significantly reduced cost.

What is claimed is:

1. A process for coating a substrate comprising:
   (a) applying a primer coating to the substrate by the process of electrodeposition of an electrodepositable film-forming composition comprising an aqueous dispersion of an ionic epoxy-based resin, a hindered amine light stabilizer and an antioxidant mixture which comprises a phenolic antioxidant and a sulfur-containing antioxidant; whereby the hindered amine light stabilizer is present in amounts of 0.1 to 3 percent by weight and the antioxidant mixture is present in amounts of 0.1 to 5 percent by weight; the percentages by weight being based on resin solids, and the weight ratio of antioxidant mixture to hindered amine light stabilizer is at least 0.5:1; and
   (b) applying a film-forming topcoat composition directly to the primer coating; said film-forming composition being permeable to ultraviolet light which will cause degradation of the primer coating resulting in delamination of the topcoat from the primer coating in the absence of the hindered amine light stabilizer and antioxidant mixture.

2. The process of claim 1 in which the hindered amine light stabilizer is present in amounts of 0.3 to 1 percent by weight.

3. The process of claim 1 in which the phenolic antioxidant is present in amounts of 0.1 to 2 percent by weight and the sulfur antioxidant is present in amounts of 0.1 to 2 percent by weight.

4. The process of claim 1 in which the weight ratio of sulfur antioxidant to phenolic antioxidant is 0.2 to 5:1.

5. The process of claim 1 in which the hindered amine light stabilizer is a hindered aminoether light stabilizer.

6. The process of claim 5 in which the hindered aminoether light stabilizer has a group of the formula:

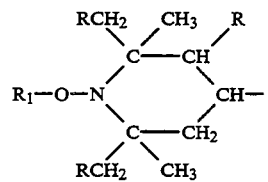

wherein R represents hydrogen or methyl and $R_1$ represents $C_1$-$C_{18}$ alkyl, $C_1$-$C_6$ hydroxyalkyl, $C_3$-$C_8$ alkenyl, $C_3$-$C_8$ alkynyl, $C_7$-$C_{12}$ aralkyl which is unsubstituted or substituted in the alkyl moiety by hydroxyl, or $C_1$-$C_{18}$ alkanoyl or $C_3$-$C_5$ alkenoyl.

7. The process of claim 1 in which the phenolic antioxidant is a triazine of a hindered phenol.

8. The process of claim 1 in which the sulfur-containing antioxidant is an alkyl thioester.

* * * * *